United States Patent
Ash et al.

[19]

[11] Patent Number: 6,151,315
[45] Date of Patent: *Nov. 21, 2000

[54] METHOD AND APPARATUS FOR ACHIEVING FABRIC INDEPENDENT ROUTING TECHNIQUE

[75] Inventors: Gerald Richard Ash, West Long Branch; Jiayu Chen, Middletown; Saul Daniel Fishman, Edison, all of N.J.

[73] Assignee: AT&T Corp, New York, N.Y.

[ * ] Notice: This patent issued on a continued prosecution application filed under 37 CFR 1.53(d), and is subject to the twenty year patent term provisions of 35 U.S.C. 154(a)(2).

[21] Appl. No.: 08/867,256

[22] Filed: Jun. 2, 1997

[51] Int. Cl.$^7$ .................................................. H04L 12/46
[52] U.S. Cl. .......................................... 370/352; 379/268
[58] Field of Search .................................... 370/351, 357, 370/360, 230, 410, 373, 395, 522, 352, 353, 354; 379/221, 219, 220, 201, 202, 268

[56] References Cited

U.S. PATENT DOCUMENTS

| | | | |
|---|---|---|---|
| 5,101,451 | 3/1992 | Ash et al. ................................ | 379/221 |
| 5,130,982 | 7/1992 | Ash ......................................... | 370/85.7 |
| 5,392,344 | 2/1995 | Ash et al. ................................ | 379/221 |
| 5,481,603 | 1/1996 | Gutierez .................................. | 379/221 |
| 5,559,877 | 9/1996 | Ash et al. ................................ | 379/221 |
| 5,696,761 | 12/1997 | Kos et al. ................................ | 370/386 |
| 5,729,601 | 3/1998 | Murai . | |
| 6,041,117 | 3/2000 | Androski et al. ....................... | 379/268 |

FOREIGN PATENT DOCUMENTS

| | | |
|---|---|---|
| 0613316A2 | 8/1994 | European Pat. Off. . |
| 0740441A2 | 4/1995 | European Pat. Off. . |

OTHER PUBLICATIONS

"Managing the CCS # 7 Network: An Evolutionary Approach" Datapro, Dec. 1995 pp. 1–9 Comment: This document describes a common channel signaling system.

"Common Channel Signaling System No. 7" Datapro, Jun. 1996, pp. 1–18 Comment: This document is relevant from the standpoint of describing a common channel signaling system.

"Signaling Concepts" Datapro, Jul. 1996, pp. 1–13 Comment: This document describes signaling of information in a telecommunications network.

"CCS 7 Offers New Paths to Revenue Generating Services" AT&T Technology, vol. 6, No. 2, 1991, pp. 8–13 Comment: This document describes AT&T's signaling system.

(List continued on next page.)

*Primary Examiner*—Douglas W. Olms
*Assistant Examiner*—Ken Vanderpuye
*Attorney, Agent, or Firm*—Robert B. Levy

[57] ABSTRACT

The routing of calls in a telecommunications switching system ($12_1$, $12_2$) comprised of one or more fabrics ($22_1$, $22_2$, $22_3$) controlled by corresponding fabric controllers ($26_1$, $26_2$ and $26_3$, respectively) is carried out by a routing processor (28) independent of the fabrics. The routing processor actually selects the route for each call by specifying a channel to a neighboring switching system to carry the call. Further, the routing processor has the capability to respond to queries from other switching systems regarding trunk group status and traffic load to enable the processor to assist the routing processor of the other switching system to make routing decisions. By implementing fabric independent routing, routing processing is re-used for new fabric capacity, and is readily extended to accommodate new service types, such as bursty data services. Fabric independent routing achieves lower development cost by avoiding re-development of routing functions on new fabric controllers, as they are added, and the addition of new routing features is made on a single routing processor function versus multiple fabric controllers. Fabric independent routing allows routing processing to be implemented on processors with essentially unlimited real-time and memory resources by riding the processor technology curve, and achieves performance advantages such as reduced call set up delay and improved overall switch reliability.

13 Claims, 3 Drawing Sheets

OTHER PUBLICATIONS

U.S. Patent Application Serial No. (Attorney Docket Chu 2–11–11) Filed Feb. 5, 1997, "Method for Interfacing a Telephony and ATM Network to Establish Voice Communications" Comment: This application describes a method for establishing communications paths over a circuit switched network and an ATM network.

"The 5ESS Switching System: Hardware Design", AT&T Technical Journal, vol. 64, No. 6, Jul.–Aug. 1985, pp. 1417–1437 Comment: This document describes the hardware associated with a model 5ESS switching system.

"The 5 ESS Switching System: Operational Software", AT&T Technical Journal, vol. 64, No. 6, Jul.–Aug. 1985, pp. 1357–1416 Comment: This document describes the operating software associated with a model 5ESS switch.

"Advanced Intelligent Network (AIN) 0.1 Switching Systems Generic Requirements", Technical Reference TR–NWT–001284, Issue 1 Aug. 1992, Bellcore, Redbank, New Jersey pp. 1–3 Comment: This document describes Operating Systems and intelligent peripherals.

"Functional Architecture For A Next Generation Switch" Hellstern et al. Proceedings IEEE INFOCOM 1990, San Francisco, CA, Jun. 3–7, 1990, pp. 709–795.

METHOD AND APPARATUS FOR ACHIEVING FABRIC INDEPENDENT ROUTING TECHNIQUE

TECHNICAL FIELD

This invention relates to a technique for routing calls from one telecommunication switching system to another switching system independent of the fabric in each system.

BACKGROUND ART

Present day telecommunications networks typically include a plurality of switching systems linked via transmission facilities (e.g., trunks and/or channels) that carry "calls" (in the form of voice, video or data) between switching systems. Additionally, these switching systems are typically linked via a signaling (data) network that transmits signaling messages between switching systems. Further, within a given telecommunications network, control information may flow between switching systems and databases, intelligent peripherals, or other specialized resources, as is well known in the art.

A present day switching system includes a switching fabric and a control mechanism as a single integrated system. The control mechanism of a switching system provides the intelligence to operate a specific switching fabric and some (or possibly all) of the intelligence required to interpret and respond to signals. The switching fabric includes devices for the termination of transmission facilities, as well as devices that provide multiple stages of space and time switching as is understood in the art. Additionally, the switching fabric may also include local intelligence, in the form of a processor or the like, for acting upon commands from the control mechanism. Within prior art switching systems, the control mechanism includes one or more special purpose computers that control such functions as connecting communications paths, and to varying degrees, receiving and sending signaling messages, performing operations, administration and maintenance functions, and providing call processing and customer services (e.g., service logic).

The switching fabric of present day switching systems controls call routing. In other words, the switching fabric, under control of its associated intelligence, makes decisions regarding trunk selection in order to transmit calls to another fabric of another switching system. Various techniques presently exist for routing calls and will not be discussed in detail. Examples of call routing techniques include Real-Time Network Routing (RTNR), Success to the Top Routing (STT) as well as Class-Of-Service Routing.

The nature of the switching fabric in present day switching systems is dependent on the nature of the calls carried by that fabric. For example, circuit-switch type switching systems typically utilize one type of fabric for carrying voice calls. In contrast, Asynchronous Transfer Mode (ATM) switching systems typically utilize a packet-type fabric for carrying data calls. Different types of fabrics route calls differently. Even though two different types of fabrics may utilize a particular routing technique, the implementation of that technique within one type of fabric is often necessarily different from its implementation in another type of fabric. Thus, when implementing a new routing technique, different implementations must be provided for different types of fabrics. As a result, development costs for implementing a new routing technique tend to be expensive.

Thus, there is need for a technique for achieving fabric-independent routing.

BRIEF SUMMARY OF THE INVENTION

In its most general sense, the invention is directed to a novel apparatus and method for controlling routing in a switching system. Specifically, the invention comprises a routing processor (RP) for controlling routing independent of the fabric within the switching system. Note that the switching fabric within the switching system may be a packet-based fabric or a circuit-switched fabric.

The invention also provides a method for separation of the routing function from the connection functions, the latter occurring within the switching fabric. The routing processor of the invention maintains a dynamic routing data base that track calls in progress as well as the traffic load. The routing processor also allocates, and when necessary, reserves bandwidth among idle networks. The routing processor actually selects the route for each call by specifying a channel to a neighboring switching system that carries the call. Further, the routing processor has the capability to respond to queries from other switching systems regarding traffic load to enable the processor to assist the routing processor of the other switching system to make routing decisions.

DETAILED DESCRIPTION

Figure 1:
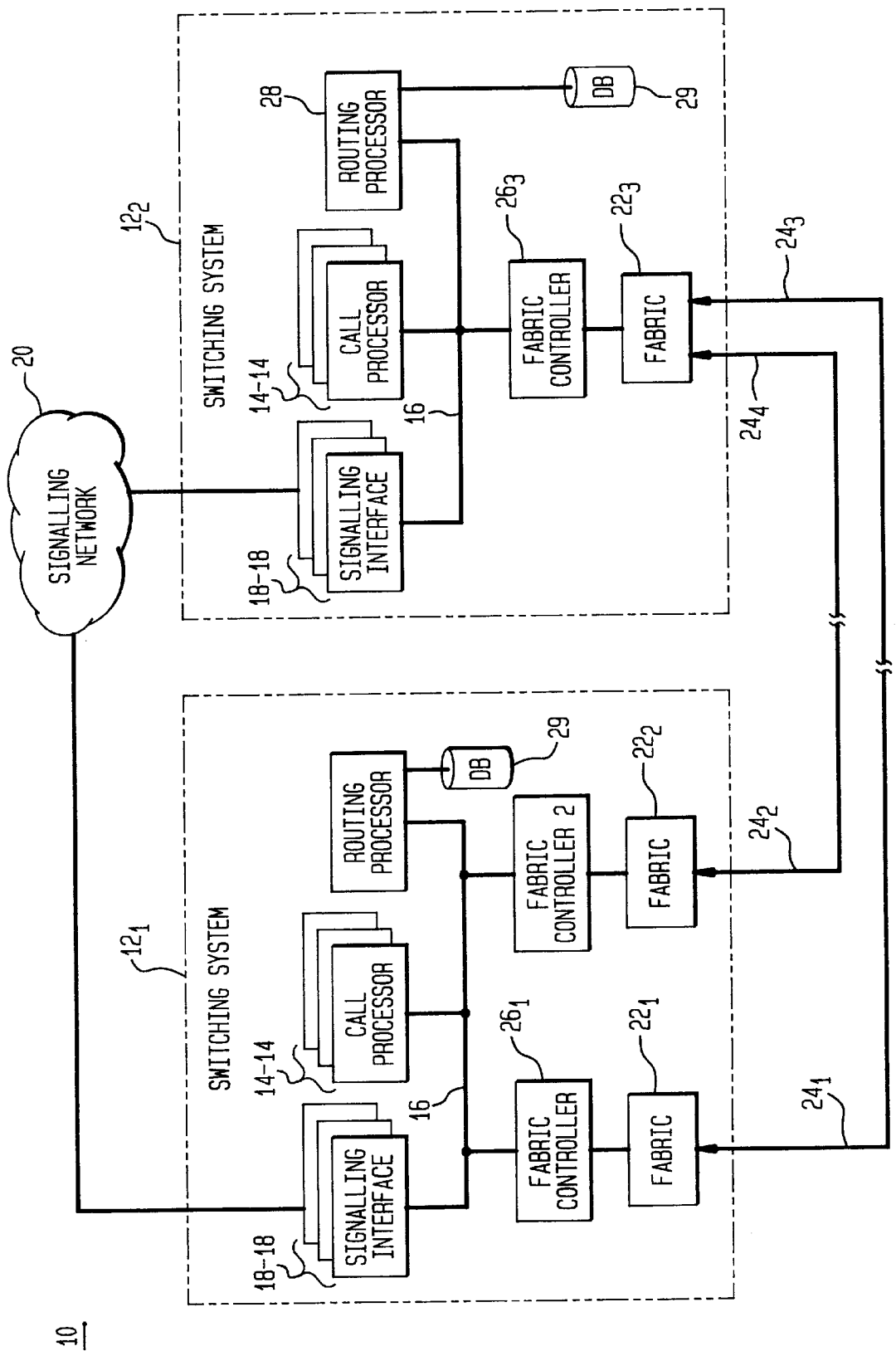
FIG. 1 illustrates a block schematic diagram of telecommunications network that includes a plurality of switching systems each in accordance with the invention.

FIG. 1 depicts a telecommunication network 10 comprising a first and second switching systems $12_1$ and $12_2$, each constructed in accordance with the invention. The switching systems $12_1$ and $12_2$ each includes multiple call processors 14—14, each of which possesses the call associated logic necessary to process a call within the corresponding switching system. For example, the call processor 14 of each switching system performs call processing, service logic, signaling message processing, and address translation. A bus 16 within each of the switching systems $12_1$ and $12_2$ connects the call processor 14 to a signaling interface 18 that links its respective switching system to a signaling network 20, such as the AT&T Common Channel Signaling System 7, as is well known in the art. The signaling network 20 communicates out-of-band signaling information between the switching systems $12_1$ and $12_2$ in connection with call set-up and tear-down.

The switching system $12_1$ includes a first and second switching fabrics $22_1$ and $22_2$ that terminating transmission facilities $24_1$ and $24_2$, respectively, that may take the form of one or more trunks or channels. Each of the fabrics $22_1$ and $22_2$ also include devices (not shown) that provide multiple stages of space and time switching as is understood in the art. The fabrics $22_1$ and $22_2$ may take different forms for terminating different types of calls. For example, the fabric $22_1$ may comprise a circuit switch fabric whereas the fabric $22_2$ may comprise a packet-switch fabric.

The fabrics $22_1$ and $22_2$ are each controlled by fabric controllers $26_1$ and $26_2$, respectively, that are linked to the call processor 14 via the bus 16. Each of the fabric controllers $26_1$ and $26_2$ within the switching system $12_1$ comprises a processor or group of processors specifically designed for controlling a corresponding one of fabrics $22_1$ and $22_2$, respectively. In practice, each of the fabric controllers $26_1$ and $26_2$ facilitates the connection functions performed by its corresponding fabric, including functions such as: receiving dialed digits, determining whether a call can be established, setting up a channel, maintaining the channel, and taking down the channel.

Like the switching system $12_1$, the switching system $12_2$ includes at least one switching fabric $22_3$ for terminating transmission facilities $24_3$ and $24_4$, each taking the form of one or more trunks or channels. A fabric controller $26_3$, comprising a processor or a group of processors, controls the fabric $22_3$ to facilitate the connection functions performed by the fabric. The fabric controller $26_3$, is linked to the call processor 14 within the switching system $12_2$ via the bus 16.

In the past, the fabrics $22_1$–$22_3$, under the control of their fabric controllers $26_1$–$26_3$, respectively, performed call routing. In other words, the fabrics $22_1$–$22_3$ would select, assign and reserve trunks or channels based on various criterion to route calls from one switching system to another. The disadvantage associated with performing the call routing functions within each of the fabrics $22_1$–$22_3$ is that the fabrics are typically different. Thus, implementation of a particular routing techniques, say Class-of Service Routing, in a particular fabric is different because of the particular nature of that fabric. Thus, implementing new routing techniques tends to be complex and expensive because of the need to tailor the routing techniques for each different type of fabric. Furthermore, implementing routing functions in multiple fabrics is not cost effective.

In accordance with the invention, the routing function previously performed in each fabric is performed by a separate, fabric-independent routing processor 28 within each of the switching systems $12_1$ and $12_2$. The routing processor 28 in each switching system is linked by the bus 16 to the call processor 14. The routing processor 28 includes a dynamic routing data base 29 that tracks all dynamic data, including, for example calls-in-progress, traffic load, bandwidth reservation, trunk group load status as well as trunk busy/idle status. In response to commands from the call processor 14 in each switching system, the routing processor 28 systems performs call routing functions, including selecting a route by selecting, assigning and reserving the required trunk or channel. The routing processor 28 also allocates, and when necessary, reserves bandwidth among idle networks. The routing processor 28 actually selects the route for each call by specifying a channel to a neighboring switching system that carries the call. Further, the routing processor 28 has the capability to respond to queries from other switching systems regarding trunk group load status and traffic load to enable the processor to assist the routing processor of the other switching system to make routing decisions as described below with respect to FIG. 2. With the routing functions performed by the routing processor 28, the fabric controllers $26_1$–$26_3$ simply control their corresponding fabrics $22_1$–$22_3$, respectively, to perform cross-connect functions or other fabrics related hardware control functions, such as per-call-control execution of echo cancellation or other voice processing functions. Thus with fabric independent routing, most routing functionality and data reside within each routing processor 28 designated to do the routing processing function. Hence, the routing processor 28 performs all logical routing functions, while each of the fabric controllers $26_1$ and $26_2$ performs fabric-specific hardware related routing functions.

In one implementation, the routing processor 28 and each of the call processors 14—14 use the same hardware/software platform to simplify operation, administration, maintenance, and provisioning. A call is processed by one of many call processor 14—14. However, routing is performed in one centralized routing processor 28 (with a back up, not shown), where dynamic data is stored in the centralized database 29. The call processors 14—14 and the routing processor 28 have the same software, but a primary routing processor 28 and backup are designated from the pool of call processors 14—14. The backup routing processor becomes the primary routing processor when the primary routing processor fails, and any other call processor 14 can then be designated to perform the backup routing processor function, where that call processor is then initialized to be the new back-up routing processor.

In a distributed fabric independent routing implementation option, the routing processor 28 still maintains the centralized database 29, but communicates information from this database every 1–2 seconds to each call processor 14. In this option, trunk status and trunk hunt could be done in each of the fabric controllers $26_1$ and $26_2$, and the fabric controller would update the routing processor with each trunk busy/idle status change. Every 1–2 seconds the routing processor 28 updates each call processor 14 with the number of busy/idle trunks, and with all traffic related data, including calls-in-progress, blocking rates, number of blocked calls, completion rates, and other traffic related data needed for routing processing in the call processors. (With an ATM fabric controller, the total idle/busy bandwidth slots are communicated.) The routing processor 28 does the processing of all traffic data collection and summarization for external operations system use, such as Real-Time network surveillance.

Each call processor 14 performs normal routing processing using the 1–2 second old status/traffic data received from the RP 28. The call processor 14 specifies to one of the fabric controllers $26_1$ and $26_2$ on call setup: (a) trunk group choices, including the direct trunk sub-groups in the direct/ engineered route, if it exists and is not in a reserved state in which the direct route is not allowed, and the via trunk sub-groups, (b) the trunk hunt method to be used, such as randomize/load balance, sequential, or other, and (c) per-call-control execution data, such as activate echo cancellation. The fabric controller responds to the call processor 14 with the trunk selected, or all trunks busy. The call processor 14 sets up the call with normal routing processing, or blocks the call if all trunks busy is received from the fabric controller. The call processor 14 notifies the routing processor 28 of every completed call, every disconnected call, every crankback event, every blocked call, and all traffic related events.

The advantages of a distributed fabric independent routing option are: (a) balancing of Real-Time work between the call processors 14—14, the routing processor 28, and the fabric controllers $26_1$ and $26_2$, (b) reducing call setup delay since the call processor 14 sets up a call directly to the fabric controller, and not through the routing processor 28, (c) making the architecture more robust, since in one embodiment, the call processors are independent of a dual routing processor failure by using a simple back up routing strategy, such as Success-To-the-Top (STT) routing.

Figure 2:
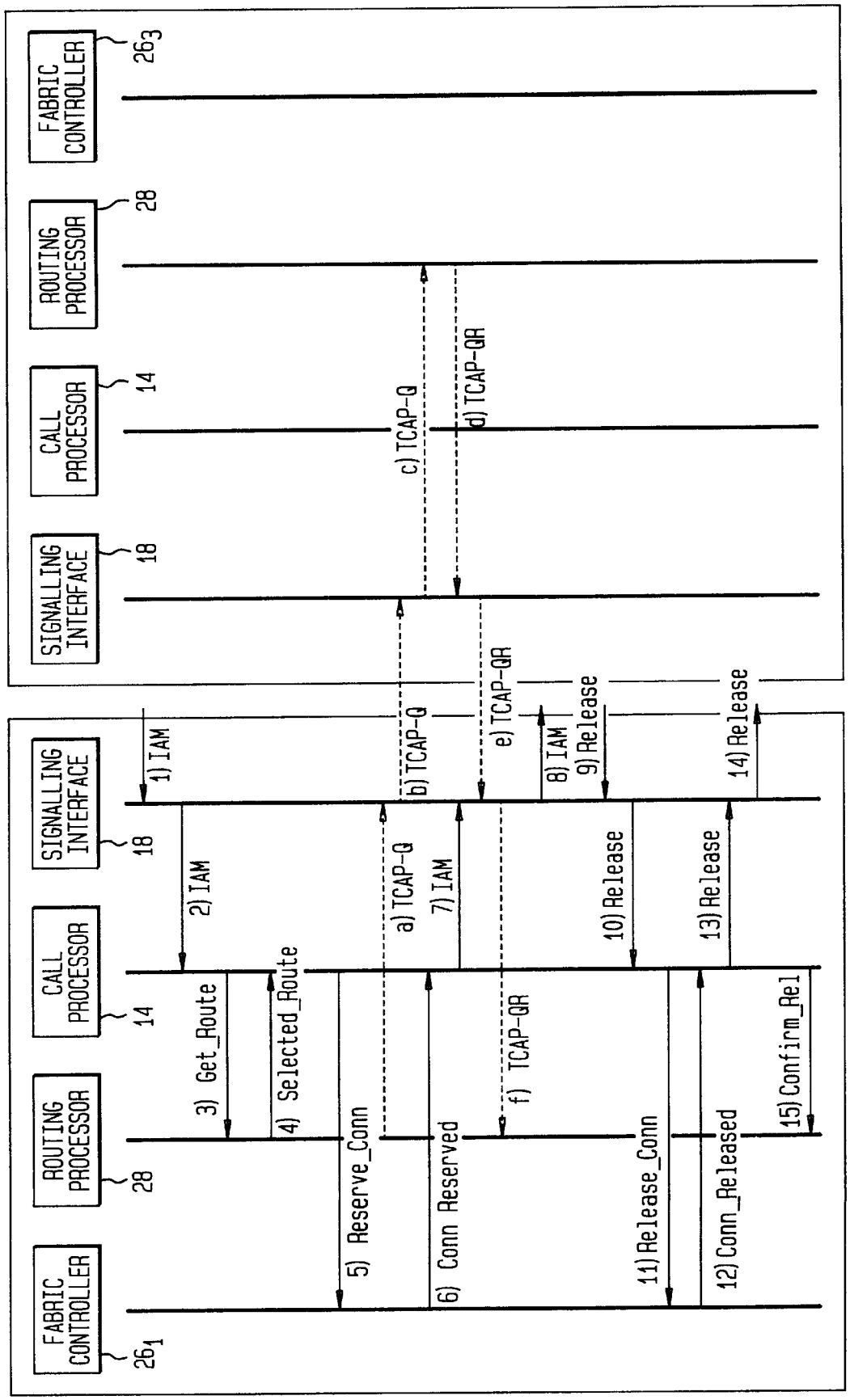
FIG. 2 illustrates a call flow diagram showing the manner in which calls are routed within the network of FIG. 1.

Referring to FIG. 2, there is shown a call flow diagram illustrating the manner in which the routing processor 28 within the switching system $12_1$ routes calls. (Although not shown, the routing processor 28 within the switching system $12_2$ operates in substantially the same manner as the routing processor 28 within the switching system $12_1$.) Call routing commences upon receipt of an Initial Address Message (IAM) at the signaling interface 18 within the switching system $12_1$ that sets up a call. The IAM received by the signaling interface 18 is forwarded to the call processor 14, which, in response, commands the routing processor 28 to get a route for the call. The routing processor 28 selects a route by selecting the trunk or channel on which an outgoing leg of a call should be placed. For purposes of discussion, the selected route is assumed to encompass only the transmission facilities terminated by the fabric $22_1$ of FIG. 1 although the selected route could include one or more transmission facilities terminated by the fabric $22_2$ of FIG. 1. After selecting the route, the routing processor 28 advises the call processor 14, which, in turn, instructs the fabric controller $26_1$ controlling the fabric $22_1$ to reserve the required transmission facilities. (Note that if the route selected by the routing processor 28 had involved the transmission facilities terminated by the fabric $22_2$, then the call processor 14 would have commanded the fabric controller $26_2$ to reserve the appropriate connections.) After reserving the connections, the fabric controller 28 signals the call processor 14 within the switching system $12_1$ that this task has been completed. Upon receipt of the connection reserved signal, the call processor 14 within the switching system $12_1$ generates an IAM for transmission via the signaling interface 18 to the signaling network 20 for receipt by a downstream switching system to signal set-up of a call.

In some instances, the routing processor 28 within the switching system $12_1$ may wish to retrieve load state information from a far end switching system, e.g., switching system $12_2$, for the purpose of routing the next call. (Note that the routing processor $28_1$ could query the far end switch $12_2$ for the current call. However, doing so would possibly delay routing.) To determine the load state of the far-end switch $12_1$, the routing processor 28 within the switching system $12_1$ sends a Transactional Capabilities Application Part (TCAP) query to the signaling interface 18, In response, the signaling interface 18 within the switching system $12_1$ sends the TCAP inquiry across the signaling network 20 of FIG. 1 to the signaling interface 18 within the far-end switching system $12_2$. The signaling interface 18 within the switching $12_2$ passes the TCAP query to the routing processor 28 within that switching system. The routing processor 28 within the far end switching system $12_2$ consults its data base 29 to obtain the requested information and provides the requested information via a TCAP query response. The TCAP query response generated by the routing processing 28 within the switching system $12_2$ passes to the signaling interface 18 within that switching system for transmission via the signaling network 20 to the switching system $12_1$ whose routing processor 28 had requested the information. The routing processor 28 utilizes the TCAP query response from switching system $12_2$ to make subsequent routing decisions.

Thus far, what has been described is the manner of call set-up. Ultimately, however, one or both parties to the call will ultimately hang-up, necessitating tear-down of the connection that previously carried the call. Call tear-down commences upon receipt at the switching system $12_1$ of a Release message received by the signaling interface 18 from the signaling network 20. The signaling interface 18 passes the release message to the call processor 14, which, in response, commands the fabric controller $26_1$ to release connection. After releasing the connection, the fabric controller $26_1$ alerts the call processor 14 of the release. After being notified of the released connection, the call processor 14 of the switching system $12_1$ sends a release completed message to the signaling interface 18 for transmission via the signaling network 20 of FIG. 1. In the process of generating the release complete message, the call processor 14 also confirms to the routing processor 28 that the connection has been released, allowing the routing processor to update its data base 29 regarding calls in progress, idle link band width, as well as trunk busy/idle status.

As may be appreciated, migrating the routing functions to the routing processor 28 within each switching system eliminates the need to duplicate the routing technique in multiple fabric controllers and to tailor the routing technique to the particular fabric, thus reducing development costs. By migrating the routing functions to the routing processor 28, call routing becomes independent of each fabric. Moreover, migrating the routing functions to the routing processor 28 helps reduce the load on each call processor 14. Additionally, employing a separate intelligence, in the form of routing processor 28, to perform the routing functions allows the processor to be optimized for routing.

Figure 3:
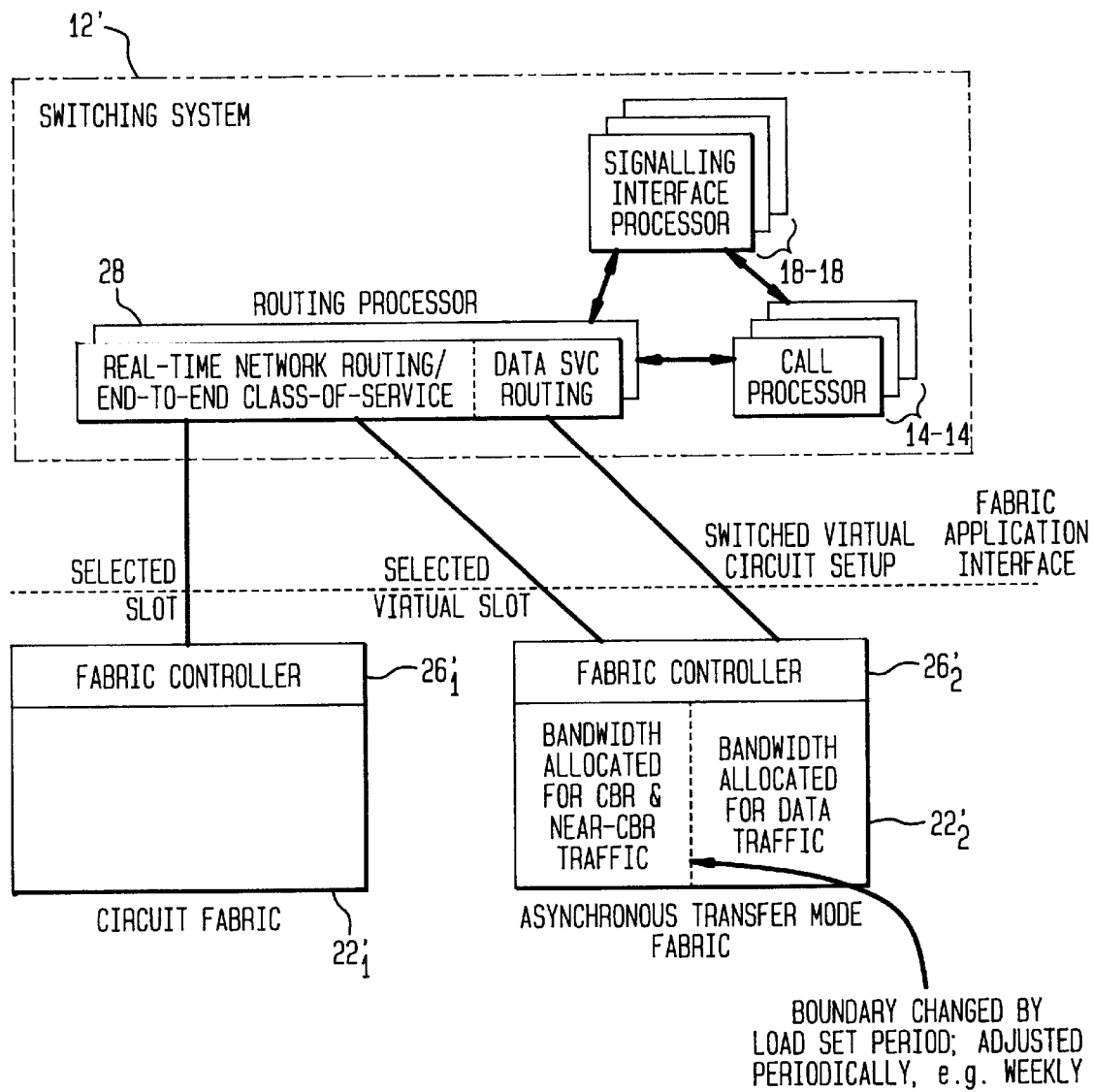
FIG. 3 is a block schematic diagram of a second embodiment of the network of the invention.

The fabric independent routing concept can evolve the routing processing implemented within the routing processor 28 to support both voice and data services in an integrated network, such that the services are offered on different fabrics, as illustrated in FIG. 3. As seen in FIG. 3 a single switching system 12', configured in the same manner as the Switching systems $12_1$ and $12_2$ of FIG. 1 may be associated a circuit switch fabric $22_1$' and an ATM fabric $12_2$' controlled by fabric controllers $26_1$' and $26_2$', respectively. Typically data services can be quite bursty in nature and are often implemented on a network with a packet based fabric, such as the ATM fabric $22_2$' and with virtual circuit routing for bandwidth allocation. Virtual circuit routing for constant bit rate (CBR) services, such as voice services, or near CBR services, such as compressed voice services, can use routing methods quite analogous to those used in circuit-switched networks. For example, the concept of a bandwidth slot, or segment of bandwidth, can be used in lieu of the time-division multiplex slot, or trunk, in the circuit-switched network. However, for very bursty data traffic, such as computer communications services, routing methods more specialized to such data traffic are employed.

As illustrated in FIG. 3, such data services routing methods can be implemented on the routing processor 28 for use with the data services in question, which are routed on the packet based fabric, (e.g., the ATM fabric $22_2$'). In addition, bandwidth on the ATM fabric can be allocated between the CBR and near-CBR services, and the bursty data services, for assurance of meeting performance objectives for all service classes. For example, the assurance of cell dropping rate below a certain objective can be achieved by defining a boundary in the bandwidth allocated, as illustrated in FIG. 3, in which neither service class can use more than its total allocated bandwidth. In this way, for example, highly bursty data traffic can not cause performance degradation such as higher cell dropping rates (due to overflow of buffer queues) of the CBR traffic in the short, bursty data traffic intervals. For this purpose, the bandwidth allocation can be periodically adjusted, as shown, by load set period (LSP) to allow for the variability of the total traffic demand among the traffic classes.

By implementing fabric independent routing, routing processing is re-used for new fabric capacity, and is readily extended to accommodate new service types, such as bursty data services. Fabric independent routing achieves lower development cost by avoiding re-development of routing functions on new fabric controllers, as they are added, and the addition of new routing features is made on a single routing processor function versus multiple fabric controllers.

Fabric independent routing allows routing processing to be implemented on processors with essentially unlimited Real-Time and memory resources by riding the processor technology curve, and achieves performance advantages such as reduced call set up delay and improved overall switch reliability.

It is to be understood that the above-described embodiments are merely illustrative of the principles of the invention. Various modifications and changes may be made thereto by those skilled in the art which will embody the principles of the invention and fall within the spirit and scope thereof.

What is claimed is:

1. A telecommunication network that includes at least one switching system having at least switching fabric of a particular kind for terminating at least one transmission medium and for performing call connection processes and a control mechanism for controlling the switching fabric, the improvement comprising:

a routing processor for performing call routing functions independent of the kind of fabric in said switching system, said routing processor selecting a route by communicating information to select, assign and reserve a transmission medium terminated by said switching fabric, and wherein the routing processor includes a data base for tracking routing dynamic data; including calls in progress, traffic load bandwidth reservation, trunk group load status and trunk/busy idle status.

2. The network according to claim 1 wherein the data base stores load information accessible by a routing processor in a second switching system.

3. A telecommunication network that includes:

a plurality of switching systems, each having at least one switching fabric of a particular kind for terminating at least one transmission medium and for performing call connection process and a control mechanism for controlling the switching fabric, a signaling system for communicating information among switching systems, the improvement comprising:

a routing processor within said each switching system for performing call routing functions independent of the kind of fabric, said routing processor selecting a route by selecting, assigning and reserving a transmission medium terminated by said switching fabric, each routing processor associated with said at least one switching system having the capability to sending inquires to, and receiving inquires from a routing processor associated with another switching system, via the signaling system, regarding traffic load to enable the processor to make routing decisions.

4. The network according to claim 3 wherein each routing processor includes a data base for tracking dynamic data, including calls in progress, traffic load bandwidth reservation, trunk group load status and trunk/busy idle status.

5. The network according to claim 3 wherein the data base stores load information accessible by the routing processor said other switching system.

6. The network according to claim 3 wherein the routing functions performed by the routing processor are logical functions whereas the fabric controller performs physical routing functions.

7. The network according to claim 3 including both a circuit switch fabric and a data fabric, and wherein the routing processor performs call routing functions in each fabric.

8. The network according to claim 6 wherein the routing processor performs call routing for bursty data services within the ATM fabric in an efficient manner.

9. A method for routing calls within a telecommunication switching system, comprising the steps of:

reserving at a first telecommunications switching system having a switching fabric of a particular kind a call set-up message;

generating, in response to said call set-up message, a command to a routing processor within the telecommunications switching system to select a route for a call, said routing processor being independent of the kind of switching fabric in said switching system that terminates a communications medium that carries the call, wherein the routing processor tracks dynamic data, including calls in progress, traffic load bandwidth reservation, trunk group load status and trunk/busy idle status;

selecting a route for a call by said routing processor in response to said command to select a route; and establishing the selected route in the switching fabric in the switching system that terminates at least one communications channel.

10. The method according to claim 9 wherein the routing processor interrogates a routing processor in a far end switching system to determine load information in order to select a route for a subsequent call.

11. The method according to claim 9 including the step of storing, at the routing processor, load information for receipt by another routing processor.

12. A telecommunication network that includes at least one switching system having at least one switching fabric of a particular kind for terminating at least one transmission medium and for performing all connection processes and a controller for controlling the switching fabric, the improvement comprising:

a routing processor for performing call routing database functions independent of the kind of fabric, said database functions including tracking calls in progress, traffic load bandwidth reservation, trunk group load status and trunk/busy idle status;

at least one call processor for performing routing functions, including selecting a route by selecting, assigning and reserving a transmission medium;

wherein the fabric controller performs trunk hunting and trunk status determination and updates the routing processor by providing the trunk status to the data base;

wherein the routing processor updates each call processor with trunk status and traffic data; and wherein each call processor updates the routing processor with information about calls connected, calls disconnected, as well as calls blocked.

13. The network according to claim 12 wherein the call processor controls the fabric controller to specify (a) trunk group choices for routing, (b) the trunk hunt method, and (c) per-call execution of specialized call processing such as echo cancellation.

* * * * *